United States Patent
Pratt et al.

(10) Patent No.: US 9,269,077 B2
(45) Date of Patent: Feb. 23, 2016

(54) ADDRESS BOOK AUTOFILTER

(75) Inventors: James Pratt, Round Rock, TX (US); Steven M. Belz, Cedar Park, TX (US); Marc Sullivan, Austin, TX (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 406 days.

(21) Appl. No.: 12/947,497

(22) Filed: Nov. 16, 2010

(65) Prior Publication Data

US 2012/0124059 A1    May 17, 2012

(51) Int. Cl.
G06F 7/00        (2006.01)
G06Q 10/10    (2012.01)

(52) U.S. Cl.
CPC .................................. *G06Q 10/107* (2013.01)

(58) Field of Classification Search
None
See application file for complete search history.

(56) References Cited

U.S. PATENT DOCUMENTS

| | | | |
|---|---|---|---|
| 5,530,853 A | 6/1996 | Schell et al. | |
| 7,383,250 B2 | 6/2008 | Scian et al. | |
| 7,469,271 B2 | 12/2008 | Shimada et al. | |
| 7,673,003 B2 | 3/2010 | Little, II | |
| 7,747,690 B2 | 6/2010 | Kraenzel et al. | |
| 2006/0218253 A1* | 9/2006 | Hays | 709/220 |
| 2007/0100603 A1* | 5/2007 | Warner et al. | 704/9 |
| 2007/0208569 A1* | 9/2007 | Subramanian et al. | 704/270 |
| 2008/0166992 A1* | 7/2008 | Ricordi et al. | 455/404.2 |
| 2008/0235242 A1 | 9/2008 | Swanburg et al. | |
| 2009/0192995 A1 | 7/2009 | Kim | |
| 2010/0008490 A1* | 1/2010 | Gharachorloo et al. | 379/216.01 |
| 2010/0199177 A1 | 8/2010 | Kraenzel et al. | |
| 2010/0306185 A1* | 12/2010 | Smith et al. | 707/709 |
| 2011/0035377 A1* | 2/2011 | Wang et al. | 707/737 |
| 2011/0238673 A1* | 9/2011 | Carter et al. | 707/748 |

\* cited by examiner

*Primary Examiner* — Hosain Alam
*Assistant Examiner* — Thu Nga Nguyen
(74) *Attorney, Agent, or Firm* — Cantor Colburn LLP (57) ABSTRACT

A mechanism is provided for filtering an address book. Contacts are read of the address book of a user. An operative connection is maintained to a social networking site related to the user. Social networking communication data of the user is extracted from the social networking site. The contacts are ranked in the address book based on the social networking communication data of the user.

19 Claims, 6 Drawing Sheets

ADDRESS BOOK AUTOFILTER

BACKGROUND

Exemplary embodiments relate to address books, and more specifically, to filtering address books.

Mobile/portable communications devices, such as cellular telephones, include memory to store contact information. This contact information is typically arranged in an address book (also known as a contact list) and can include name, address information, telephone numbers, and email addresses. Many of these address book systems offer features such as speed dial, voice dial, custom ringtones, and images to enhance the look and user experience of the address book. Address book options allow for various communication methods including voice call, messaging, and email.

In a conventional mobile communication device providing the address book operation, a process of searching and dialing a specified phone number is performed as follows. First, a user executes a menu mode of the portable communication device by manipulating a function button or a menu button provided on the portable communication device, and selects an address book search operation by using a direction button or a numeral button. Then, the user searches for a desired phone number by scrolling the address book using the direction button or inputting a name to be searched.

Many users have multiple address books associated with multiple devices. For example, a user may have an address book for one or more mobile communications devices, home computers, work computers, and game systems. Often, many of the contacts are on multiple address books and the user is burdened with the task of entering and maintaining contact information for each contact in each of the address books. A redundant task that is both time consuming and tedious.

Software has been developed that allows two devices to be synchronized to establish a common address book. This is particularly beneficial for business professionals that use email applications to store contacts for their clients and other important contacts. The business professional may also have a mobile device, such as a smart phone, that combines traditional cellular telephone functions and personal digital assistant (PDA) functions in a single device. Synchronizing the contacts on the computer and on the smart phone ensures that the appropriate contact information is available whenever the professional is using either device. This also eliminates having to enter the same contact information into multiple devices.

People are constantly finding different ways to communicate and network, both socially and professionally. The Internet has made communication easily accessible via email and instant messaging applications. In recent years, networking websites have become popular and are becoming increasingly so. These websites allow people to share information and find others that share similar interests. Networking naturally increases the number of contacts a particular individual may have, thus, increasing the number of address book entries of contacts. This correspondingly increases the number of contacts that a user has to search to find and locate a desired contact.

BRIEF SUMMARY

According to exemplary embodiments, an apparatus is provided for filtering an address book. Memory stores a program for providing address book services. A processor is functionally coupled to the memory and is responsive to computer-executable instructions contained in the program. The processor is operative to read contacts of the address book of a user, maintain an operative connection to a social networking site related to the user, extract social networking communication data of the user from the social networking site, and rank the contacts in the address book based on the social networking communication data of the user.

Additional features are realized through the techniques of the present disclosure. Other systems, methods, apparatus, and/or computer program products according to other embodiments are described in detail herein and are considered a part of the claimed invention. For a better understanding of exemplary embodiments and features, refer to the description and to the drawings.

DETAILED DESCRIPTION OF EXEMPLARY EMBODIMENTS

The subject matter which is regarded as the invention is particularly pointed out and distinctly claimed in the claims at the conclusion of the specification. The foregoing and other features of the present disclosure are apparent from the following detailed description taken in conjunction with the accompanying drawings in which:

DETAILED DESCRIPTION OF EXEMPLARY EMBODIMENTS

Constantly, the span of communications for people is increasing. This is due to a variety of reasons including, but not limited to, the growth of social networking tools such as Facebook®, MySpace® and LinkedIn®. Particularly in the younger demographic the number of contacts in an address book can easily reach 1,000 different people. At the same time, having quick access to contacts is seen as extremely valuable. Even a slight reduction in the time to find a contact is quite valuable and would be a service differentiator.

Traditional methods of addressing the search problem in an address book are to use either user generated tags, often very crude, or an alphabetic sorting. These are simplistic methods that rely on direct user input and they become less efficient as address books grow in size. Moreover, current personal address books are static data structures. They can be modified and/or filtered but there are no dynamic characteristics.

Exemplary embodiments describe techniques to automatically filter an address book based on an extended social graph augmented by proximity and temporal communication patterns. Automatically filter refers to filtering contacts in an electronic address book without requiring user intervention.

Figure 1:
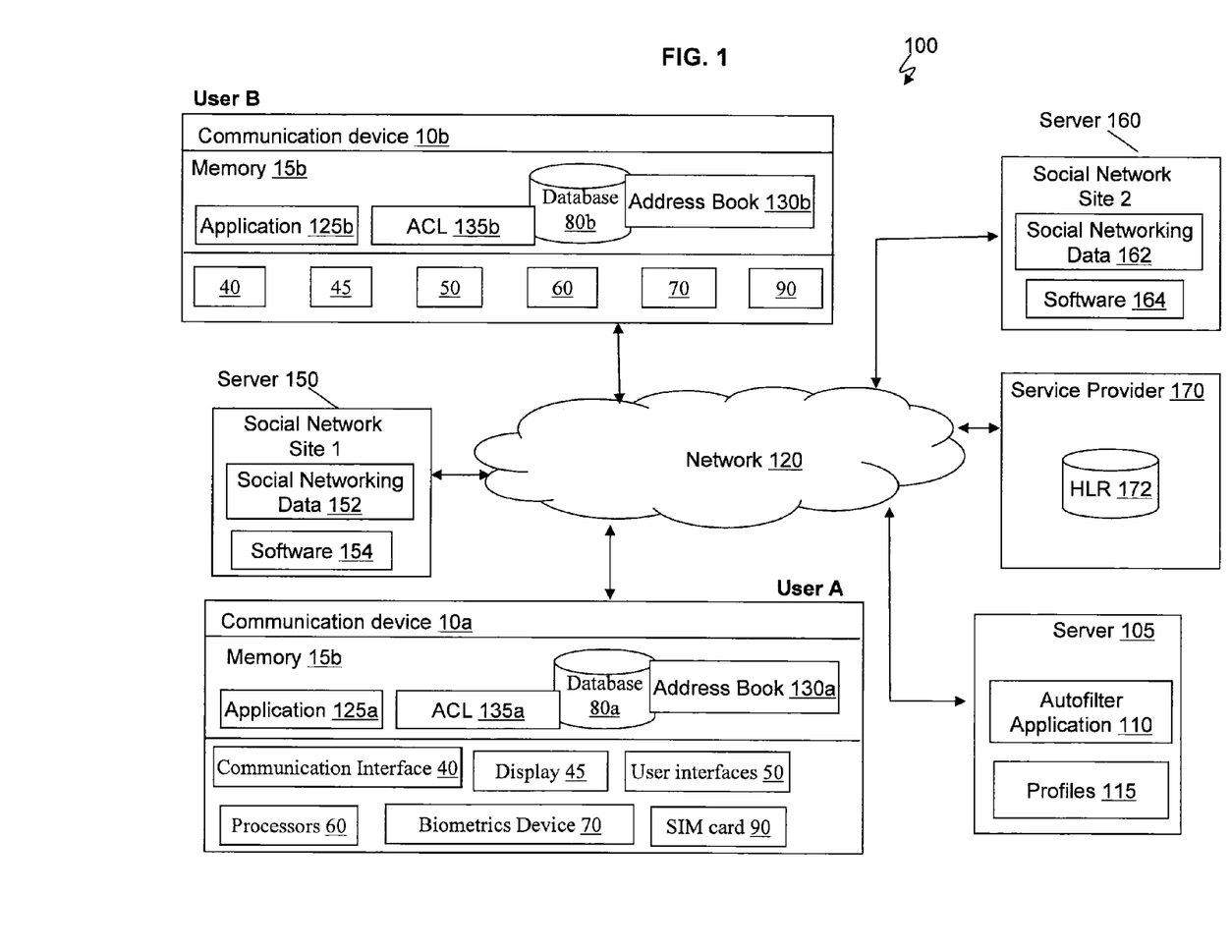
FIG. 1 illustrates a block diagram of a system architecture in accordance with exemplary embodiments.

Now turning to FIG. 1, FIG. 1 illustrates a block diagram as an example of a system 100 in accordance with exemplary embodiments. The system 100 includes communication devices 10, which are for users A and B. User A utilizes the communication device 10a and B utilizes the communication device 10b. Throughout this disclosure, when specifically referring to elements for a particular user A or B, the designation "a" and "b" will be utilized. Otherwise, discussions for the communication device 10 and its related features apply to both users A and B utilizing respective communication device 10a and 10b.

The communication device 10 may be one or more computers, cell phones, mobile phones, smart phones, personal digital assistants, and/or any type of computing device. The communication device 10 may include and/or be coupled to memory 15, a communication interface 40, display 45, user interfaces 50, processors 60, and software applications. The communication interface 40 comprises hardware and software for communicating over a network 120. The user interfaces 50 may include, e.g., a track ball, mouse, pointing device, keyboard, touch screen, etc, for interacting with the communication device 10, such as inputting information, making selections, and generally operating the communication device 10.

The communication device 10 may include a subscriber identity module (SIM) on a removable SIM card 90 which securely stores the service-subscriber key (IMSI) used to identify a subscriber on mobile telephony devices such as mobile phones and computers. The SIM card 90 allows users to change, e.g., phones by simply removing the SIM card 90 from one mobile phone and inserting it into another mobile phone or broadband telephony device.

The communication device 10 may include one or more biometric devices 70 for monitoring the user's biometrics such as heart rate; body temperature; breathing rate; pitch and/or volume in voice such as the change in pitch and/or volume due to excitement; and gait including the speed of movement such as sitting, walking, jogging, running.

The communication device 10 includes memory 15 which may be a computer readable storage medium. One or more software applications such as such as application 125, access control list program 135, and an address book 130 may reside on or be coupled to the memory 15, and each comprises logic and software components to operate and function in accordance with exemplary embodiments in the form of computer executable instructions.

A server 105 includes an autofilter application 110 and the necessary hardware and software to operate as a server as understood by one skilled in the art. The application 125 and autofilter application 110 are configured to compile and analyze multiple sources of information to rank in order contacts in the address book 130 based on the likelihood of the user intending to communicate with particular contacts, and the highest ranked contacts are automatically suggested and displayed by the application 125 and/or autofilter application 110 on display 45. At times in exemplary embodiments, the application 125 may determine the likelihood of the user intending to communicate with contacts based on sources of information and then display those contacts from the address book 130 to the user on the display 45. At other times, the autofilter application 110 may determine the likelihood of the user intending to communicate with contacts based on sources of information and then cause the application 125 to display those contacts from the address book 130 to the user on the display 45. Also, the application 125 and autofilter application 110 may cooperatively determine the likelihood of the user intending to communicate with contacts based on sources of information and display those contacts.

Exemplary embodiments are able to provide a more robust address book 130 presentation approach by utilizing multiple sources of information to order the address book 130 based on the likelihood of the user intending to communicate. In determining the likelihood of the user intending to communicate, the application 125 and autofilter application 110 comprise an algorithm that is configured to take into account many factors collectively and/or individually. Based on the factors, the application 125 and/or autofilter application 110 (only) display certain contacts, such as one or more contact icons representing contacts determined and identified by the application 125 and/or autofilter application 110 as contacts the user is likely to communicate with, while not displaying and/or suppressing other contacts not determined as likely to communicate as shown in FIGS. 2-6. Also, the application 125 and/or autofilter application 110 can bring the contacts icons having the highest likelihood of the user intending to communicate with above all other contacts in a listing of contacts in the address book 130 as shown in FIG. 6. In FIG. 6, the contact icons 610, 615, and 620 have been predicted by the application 125 and/or autofilter application 110 as being contacts that the user is likely to communicate with based on the multiple sources of communication information. Box 625 represents the remaining other contacts which may be in alphabetical order and/or recently used order, and the other contacts represented by box 625 are positioned in order below the predicted contact icons 610, 615, and 620. Accordingly, the user does not have to scroll through numerous other contacts 625 to reach the intended contacts 610, 615, and/or 620 when the address book 130 is opened.

For ease of understanding, the following examples are described for user A but apply for B and any other users. In the following example, B is considered as one of the contacts in the address book 130a of user A along with other contacts in the address book 130a of user A. One factor considered by the application 125 and/or autofilter application 110 is the communication pattern of the user A. The communication pattern includes the time of day that user A communicates with a particular contact (i.e., user B) and how frequently has that contact B been been in communication with user A across various communication mediums, e.g., such as by the multiple messaging capabilities including email, text, chat, etc., and voice calls.

Figure 2:
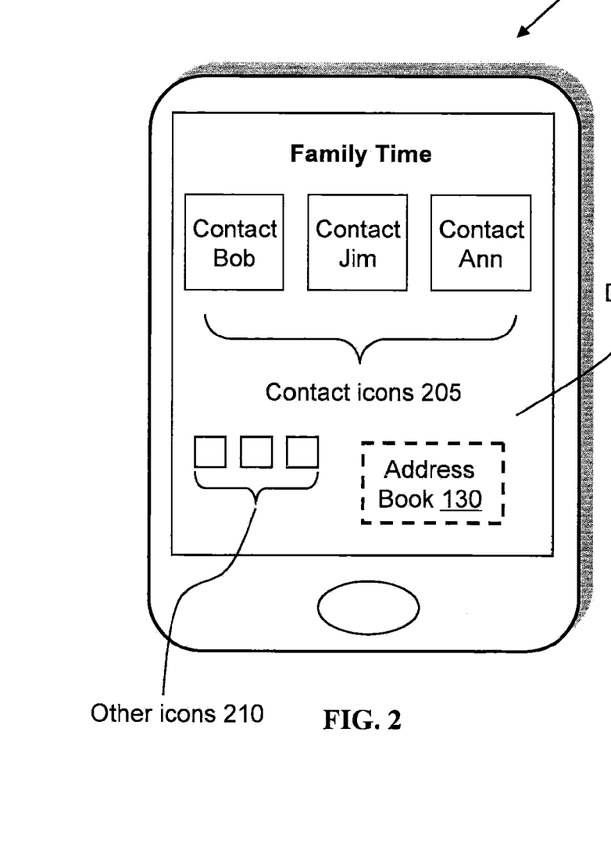
FIGS. 2-6 illustrate example views in accordance with exemplary embodiments.

Another factor is the physical proximity between user A on communication device 10a and the contact B on communication device 10b. In determining proximity, the application 125 and/or autofilter application 110 may determine how close in space, e.g., 5 feet, 30 feet, 100 feet, 1 mile, 2 miles, 2-5 miles, etc., the user A on communication device 10a is to the contact B on communication device 10b, and then based on the B being within a predefined distance, the application 125 displays on display 45 the contact icon of the user B. Also, the application 125 and/or autofilter application 110 may determine how close in space the B has been to contact B been over recent time, e.g., such as last week, 2 weeks, 3 weeks, month, 2 months, 3 months, and/or year. Based on user A having been in close proximity to contact to B in recent time and/or based on user A communicating with B before, during, and/or after the close proximity, the application 125 and/or autofilter application 110 may move the contact B up the list of contacts in the address book 130a of user A. Further, the application 125 and/or autofilter application 110 may determine that whenever user A is within 30 miles (or any determined distance) of user B, they communicate with one another on respective communication devices 10a and 10b. Accordingly, the application 125 and/or autofilter application 110 rank user B higher whenever this proximity, e.g., 30 miles, is determined between users A and B, such that the application 125 and/or autofilter application 110 causes B to display as a contact on display 45 for user A, and vice versa. All of which predicts user' A intent to communicate before user A needs to search for contact user B, who automatically is displayed on display 45. Also, based on the different times of the day and the different days of the week that user A on communication device 10a is in close proximity to contact B on communication device 10b, the application 125 and/or autofilter application 110 are configured to display the contact icon of the user B before/anticipating the times of the day that B has been in close proximity with the contact B. For example, if the B is determined by the application 125 and/or autofilter application 110 to be in close proximity to contact B and 2 other contacts during lunch at, e.g., 12:00 PM, the application 125 and/or autofilter application 110 automatically display on display 45 the contact icons for contact B and the 2 other contacts, i.e., lunch contacts, at a time before lunch such as 11:00, 10:00, and/or 9:00 AM. This allows the user A to easily call, text, and/or email these lunch contacts automatically displayed on display 45 without having to scroll and/or search through a list of contacts in the address book 130a, and when the address book 130a is opened by user A, the lunch contacts are at the very top of the list of contacts. Because of the time of day, the application 125 and/or autofilter application 110 may automatically designate these contacts as lunch time contacts just as FIG. 2 shows family time contacts. The application 125 and/or autofilter application 110 may determine that the close proximity of these lunch time contacts ends at 1:15 PM, and accordingly, the application 125 and/or autofilter application 110 stops automatically displaying on the display 45 these lunch time contacts for user A. The application 125 and/or autofilter application 110 now displays other contacts based on the likelihood of the user A intending to communicate with those other contacts, such as, e.g., work time contacts shown in FIG. 3.

Note that when user A is referred to this also implies his corresponding communication device 10a. Likewise, when B is referred to this also implies his corresponding communication device 10b.

Another factor accounted for by the application 125 and/or autofilter application 110 in displaying particular contacts on the display 45 is social graph connectivity. Drawn from social network sites, such as social networking sites 1 and 2, the application 125 and/or autofilter application 110 determine which contacts the user A is directly connected to in the social networking sites and can move these contact icons up and/or down in rank in the list of contacts in the address book 130a based on being directly connected to the user A. The application 125 and/or autofilter application 110 determines that contacts having direct connections to user A in social networking sites 1 and 2 are to be given more weight such that these contact having direct connections are moved up/ranked higher in the contact list in the address book 130a for quick selection by the user A. Also, the display of contact icons is based on the order of relationships in the social networking sites 1 and 2. For example, 2nd and 3rd order relationships are given less weight than 1st order relationships for determining when and the priority for displaying contact icons. 1st order relationships in the social networking sites 1 and 2 may be direct friends of the user A, while 2nd order relationships are be friends of user A's friends, and so forth. The application 125 and/or autofilter application 110 determines how many communications have been exchanged between contacts on the social networking sites 1 and 2, and the more communication, such as email, chats, and/or exchanging media like music, videos, pictures on the social networking site to a particular contact (i.e., user B), the higher that particular contact is moved up address book 130a and/or that contact icon is automatically displayed on the display 45.

More factors accounted for by the application 125 and/or autofilter application 110 in displaying particular contacts on the display 45 are the length and nature of messages. The application 125 and/or autofilter application 110 are configured to determine that the length of messages and/or messages with affective terms indicate more meaningful relationships. Longer messages including text, email, and/or chat messages are weighed by the application 125 and/or autofilter application 110 to move the B up the ranking order for contacts. These messages could be from the social networking sites 1 and 2, and/or these messages could be directly sent and received from the communication device 10a, e.g., like sending a text or email without being on or connected to the social networking sites 1 and 2. Affective terms and phrases may be predefined and stored, e.g., in the database 80 and/or user profile 115, and affective terms and phrases may include love, like, miss you, see you soon, along with other terms understood to show affection.

An additional factors accounted for, i.e., weighed by the application 125 and/or autofilter application 110 in displaying particular contacts on the display 45 are used to the user A's and the user B's biometrics as determined by their respective biometric devices 70. For example, the heart rate and/or body temperature of the two people, which are user A and B, communicating in proximity to each other represent the strength of their relationship. Based on an increase in the heart rate and/or body temperature for either and/or both user A and B, as determined by their respective biometric devices 70 of their respective communication devices 10a and 10b, the application 125 and/or autofilter application 110 rank contact B higher in the address book 130a as a result of biometrics. Likewise, the application 125 and/or autofilter application 110 can rank user A higher in the address book 130b of user B.

Also, the application 125 and/or autofilter application 110 can rank contact B higher based on a change, e.g., increase in breathing rate, increase in pitch of voice, and/or increase in volume of voice for either and/or both users A and B. Additionally, if volume increases for a short burst matching a shout or yell, if high pitch sounds are made like screeching tires, and/or if sounds are made like gun shouts, the application 125 and/or autofilter application 110 are configured to automatically display a contact number for 911 or other emergency services. Further, via the biometrics device 70, the application 125 and/or autofilter application 110 may determine that when the user A's gait increases, such as walking, jogging, and/or running, the user A communicates with the B and certain contacts during these times, e.g., when exercising. As such, then biometric device 70 indicates to the application 125 and/or autofilter application 110 that user A's gait increases to a predefine rate and/or for a predefined length of time, the application 125 and/or autofilter application 110 display on display 45 contact B and the certain contacts for this period of increased gait.

The application 125 and/or autofilter application 110 are configured to combine several and/or all factors/indicators of importance to determine intent to communicate, which is utilized to rank contacts of the address book 130. In particular, using information contained in each of the domains yields a far more accurate prediction of intent to communicate; some of these factors may be weigh more than others in determining ranking order, and the weight of each factor ma changes based on time of day, day of the week, month of the year, and/or amount of communication. The address book 130 will be ordered by the application 125 and/or autofilter application 110 based on this estimated intent to communicate.

The address book 130 may include any directory listing of persons and/or businesses as contacts. This would include such things as a cell phone address book, an email address book, a list of friends on the social networking site 1, e.g., Facebook®, a list of all college students in a city, etc. In fact, the larger the list, the more useful the automated sort by communication intent becomes.

In one implementation of this type of intent to communicate service, the centralized server 105 may be utilized.

The autofilter application 110 and/or the application 125 is configured to maintain connections to the social networking sites of the user A such as sites 1 and 2 on servers 150 and 160, and the autofilter application 110 and/or the application 125 are configured to extract social networking communication data related to the user individually communicating with each of the contacts of the address book 130. The social networking site 1 may be hosted on server 150 and include social networking data 152 of many different users including, e.g., user A. Likewise, the social networking site 2 may be hosted on server 160 and include its social networking data 162 of many different users. To obtain and extract the user's social networking communication data, respective software 154 of the server 150 and software 164 of the server 160 allow the autofilter application 110 and/or the application 125 to parse through a user interface on the sites 1 and 2 and/or to interact with an application programming interface (API) of the sites 1 and 2.

The autofilter application 110 and/or the application 125 can store, e.g., in database 80 and profile 115 and provide authentication information for the user, such as usernames and passwords for logging onto the servers 150 and 160. Also, the autofilter application 110 and/or the application 125 may log into a single sign on website like, e.g., OpenID® to authenticate the user A for many different social networking sites. OpenID® is an open standard that describes how users can be authenticated in a decentralized manner, obviating the need for services to provide their own ad hoc systems and allowing users to consolidate their digital identities.

Social networking is extended beyond to web sites that are not normally thought of as "social networking". For example, e-commerce sites contain extremely useful information about the types of purchases that are made. Anonymously computing the covariance of purchases between two individuals in one element in the social connection of the two individuals can be performed by the autofilter application 110 and/or the application 125 to determine the intent to communicate with a contact. This information can be utilized to rank that contact.

The autofilter application 110 and/or the application 125 are configured to access geographic location data about all contacts in the address book 130 which may be utilized in proximity determinations between user A and respective contacts. The location data is not revealed to any end user but is used to compute similarity in geographic location over time with a weighted recency bias in the computation; the computation is performed by the autofilter application 110 and/or the application 125 to determine which contacts of the address book 130 to provide with a higher ranking. The autofilter application 110 and/or the application 125 may access and receive geographical location data from a home location register 172 of a service provider 170 and/or a mobile switching center (MSC). As a security measure, the communication device 10 may include an access control list (ACL) 135 that allows the application 125 to access and obtain geographic location data for the contacts of the user in address book 130, but the ACL 135 is restricted from access by the user.

The autofilter application 110 and/or the application 125 are configured to maintain communication pattern data on all contacts of the address book 130a as it relates to the user A, and store the same in the database 80 and/or in the user A profile in user profiles 115. The communication pattern data is a collection for all communications on the communication device 10, where these communications are not through or on the social networking sites 1 and 2. The communication pattern data of the contacts in the address book 130 include voice calls, texts, emails, streaming, etc., communicated between the user A and each of the contacts, along with the physical proximity (i.e., geographical location data), length and natures of messages, and biometrics as discussed herein. The higher the instances of communication in the communication pattern data as determined by the autofilter application 110 and/or the application 125, the higher the ranking order for those particular contacts in the address book 130. Each instance of communication is each time the user communicates with one of the contacts and/or vice versa, and each instance of communication is added up for that particular contact in the address book 130, which is stored in the database 80 and/or the user profile 115 for the user. Also, instances of communication such as morning or evening communication, may be correlated with geographic proximity of the contact to the user A, such that the autofilter application 110 and/or the application 125 can rank higher certain contacts higher when a predefined proximity and communication when in this predefined proximity indicate an intent to communicate. In such cases, the certain contacts will be displayed on the display 45 based on this correlation.

As discussed herein, the social networking communication data includes all communication on the social networking sites, such as sites 1 and 2, between the user and the contacts in the address book 130. The autofilter application 110 and/or the application 125 algorithmically combine these different sources of communication data (both social networking communication data and communication pattern data) and factors/indicators along with the address book user's current geographical position to periodically update the address book 130 based on changes to the ranking of all address book 130 contacts.

Exemplary embodiments can improve the cellular/mobile usage experience, particularly for highly social connected customers. These customers tend to be high consumers of wireless services. Of course, this solution is not limited to just cellular address books, but to any directory type listing of individuals.

Note that that all social networking communication data and communication pattern data, along with geographic location data of both the contacts in the address book 130, and the user may be utilized by the autofilter application 110 and/or the application 125 to determine how to rank contacts for display on the display 45. FIGS. 2-5 show how the autofilter application 110 and/or the application 125 can automatically display the highest ranked contacts on the display 45 a given period of time and/or continuously, without requiring the user to select, access, and/or scroll through the address book at any time. The address book 130 may be suppressed, i.e., not visually shown on the display screen 45 with the highest ranked contact icons 205, 305, 405, 505, and the address book 130 is shown with dashed lines in FIGS. 2-5 to indicate that as an option the user may choose to display an icon for the address book 130 or the user may not choose to display the dashed line address book 130. In FIGS. 2-5, other conventional icons 210 may be displayed on the display 45, which include favorites (friends/family) icons selected by the user under a plan that allows no charges to, e.g., 5 contacts, mail message icons, web browser icons, music icons, social network icons, etc. Note that the favorite icons of friends/family are input and selected by the user, and are not automatically determined, ranked, and displayed according to exemplary embodiments.

FIG. 2 illustrates an example predictive view of the user's intent to communicate as determined by the autofilter application 110 and/or the application 125 according to exemplary embodiments. The autofilter application 110 and/or the application 125 have determined that contacts 205 should be displayed on the display 45 of, e.g., user A, so that user A can easily see these 3 contacts 205. For ease of understanding only a few contact icons are illustrated in FIGS. 2-6, but exemplary embodiments are not meant to be limited. Also, based on social networking communication data, communication pattern data, and/or geographic location data, the autofilter application 110 and/or the application 125 may determine that the user A communicates with contacts 205 during family time, which may be between 5:00-10:00 PM.

Figure 3:
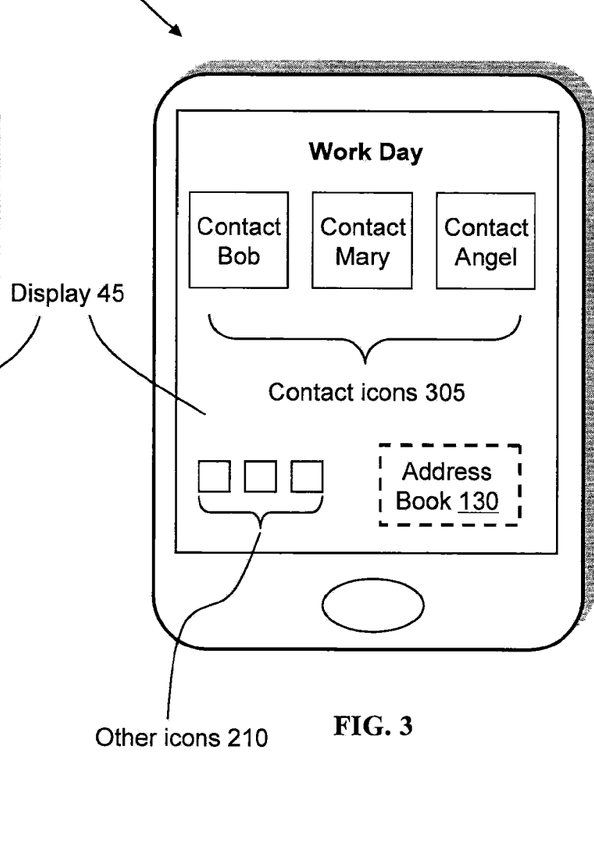

FIG. 3 illustrates an example predictive view of the user's intent to communicate as determined by the autofilter application 110 and/or the application 125 according to exemplary embodiments. The autofilter application 110 and/or the application 125 display the contacts 305 on the display 45 after determining an intent to communicate with the contacts 305 during a work day, which may be a time period from 7:30 AM to 5:00 PM. Then, the autofilter application 110 and/or the application 125 can automatically switch the display 45 to the family time view shown in FIG. 2 for this next period of time. Based on the social networking communication data, communication pattern data, and/or geographic location data, some contact may stay the same between family time and work day views in FIGS. 2 and 3, because the autofilter application 110 and/or the application 125 determines that the user A would want to communicate with a particular contact, e.g., Bob, throughout the two periods.

Figure 4:
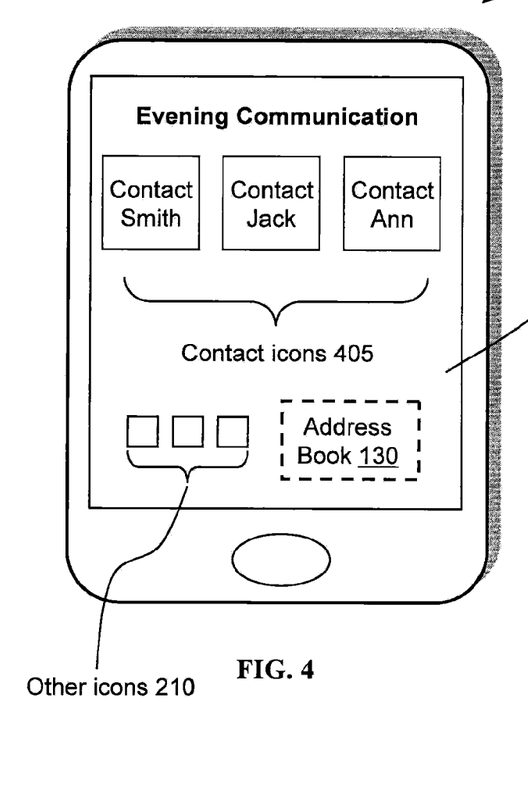
Figure 5:
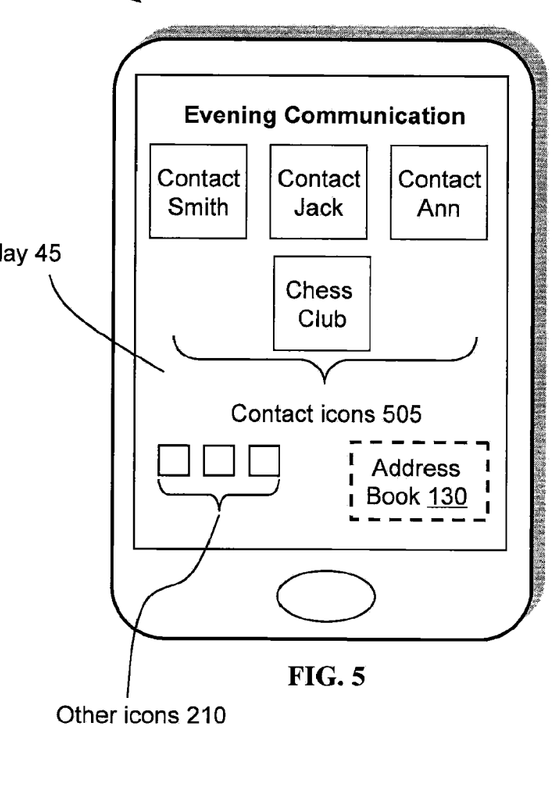
Figure 6:
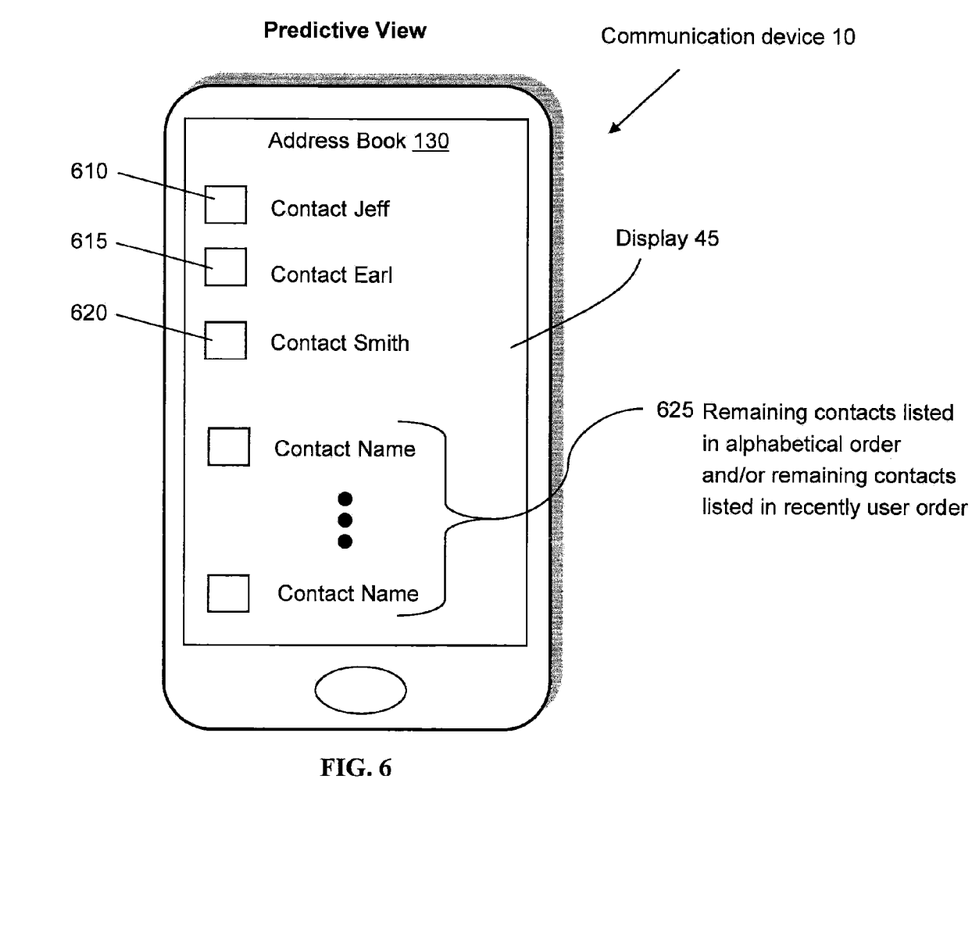

FIGS. 4 and 5 illustrate an example predictive view of the user's intent to communicate as determined by the autofilter application 110 and/or the application 125 according to exemplary embodiments. In FIG. 4, the contacts may be contacts 405 as consistently determined by the autofilter application 110 and/or the application 125 for evening communication, which may be 7:00 PM to 10:00 PM. However, based on high instances of, e.g., of communication chats, texts, calls, emails, etc., with a group contact called chess club contact during the same dates each month, same dates each year, same season of the year, e.g., football season for a football group contact, same part of a month and/or year, the autofilter application 110 and/or the application 125 now include the chess club contact during this particular period in FIG. 5. However, when this period, i.e., season passes, the evening communication displayed on display 45 would be contacts icons 405 in FIG. 4. Accordingly, the autofilter application 110 and/or the application 125 increase and decrease the ranking of contacts based on different periods as discussed for the chess club contact. For example, during summer months communications across all communication mediums may be high between users A and contact B as determined by the autofilter application 110 and/or the application 125; accordingly, the autofilter application 110 and/or the application 125 would rank higher and display contact B on the display 45 of user A for the summer months May, June, July, and August.

FIGS. 2-5 illustrate automatically displaying the high ranking contacts on the display 45 for the screen without user input indicating to display the contacts, while the address book 130 may optionally be displayed. FIG. 6 illustrates how the high ranking contacts as determined by the autofilter application 110 and/or the application 125 can be moved to the top of the address book 130 so that the user A does not have to scroll through the address book 130 to view the highest ranking contacts. Also, even when the contacts are automatically displayed on the display 45 as shown in FIGS. 2-5, the address book 130 when initiated/opened would still show those highest ranking contacts at the top of the listing of contacts.

In FIG. 6, the highest ranking contacts in order of first, second, and third are contact 610, 615, and 620. Box 625 represents the remaining contacts not having the highest ranking, and these remaining contacts 625 may be in alphabetical order and/or recently used order. In one implementation the remaining contacts 625 may also be ranked as determined by the autofilter application 110 and/or the application 125 based on the social networking communication data, the communication pattern data, and geographical location data discussed herein.

Note that the contacts 610, 615, and 620 are not ranked simply based on frequency of use and/or recently used but are ranked based on the social networking communication data, the communication pattern data, and geographical location data discussed herein, so at every moment the user A always has quick access to the displayed contacts that the user intends to communicate with as determined by the autofilter application 110 and/or the application 125.

Figure 7:
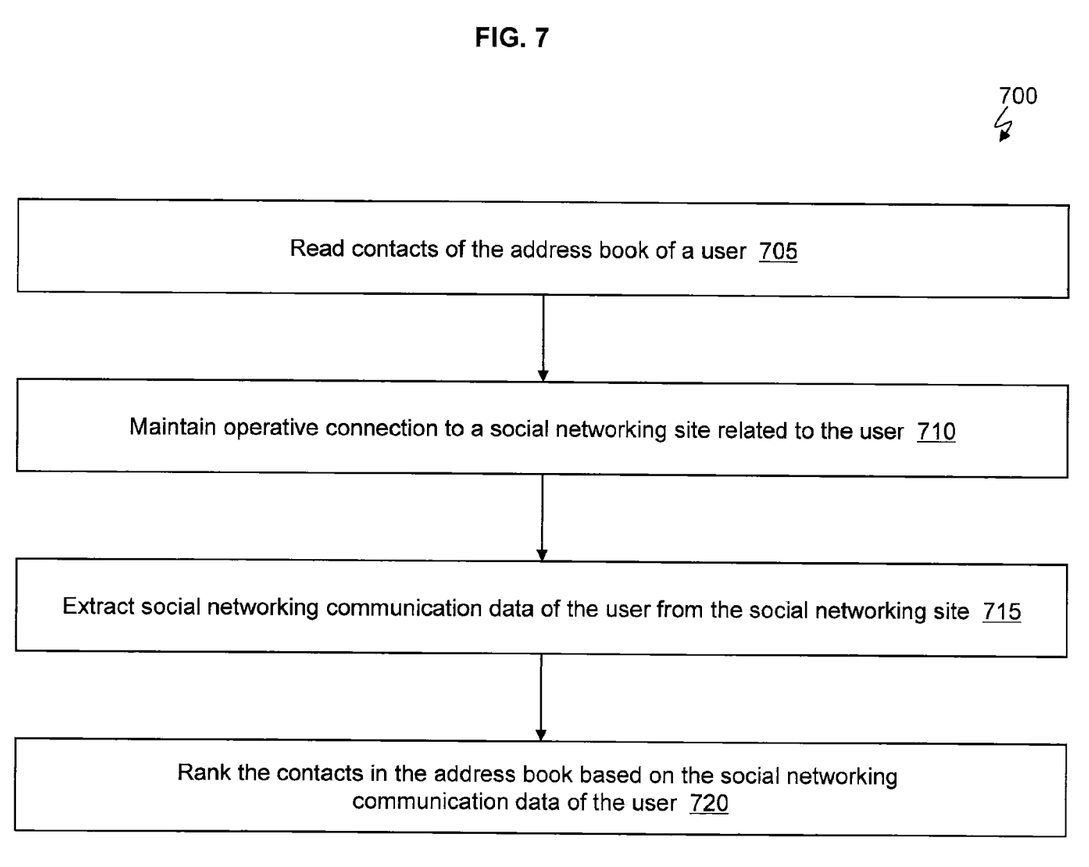
FIG. 7 illustrates a flow chart in accordance with exemplary embodiments.

FIG. 7 illustrates a flow chart 700 for determining intent to communicate of the user for ranking contacts by filtering the address book 130 in accordance with exemplary embodiments.

At operation 705, the autofilter application 110 and/or the application 125 read contacts of the address book 130 of the user.

At operation 710, the autofilter application 110 and/or the application 125 maintain an operative connection to a social networking site related to the user.

At operation 715, the autofilter application 110 and/or the application 125 extract social networking communication data of the user from the social networking site, e.g., social networking sites 1 and/or 2 on the servers 150, 160.

At operation 720, the autofilter application 110 and/or the application 125 rank the contacts in the address book 130 based on the social networking communication data of the user.

Further, when extracting social networking communication data of the user from the social networking site, the autofilter application 110 and/or the application 125 determines a number of instances of communication on the social networking site with contacts of the address book 130, where the instance of communication is a communication between the user and the contacts on the social network site. The autofilter application 110 and/or the application 125 rank the contacts higher who have a higher number of instances of communication with the user on the social networking site, and/or who have affectionate terms/phrases in communication messages.

Also, the instances of communication of the social network site between the user and the contacts include electronic mail (email); texts; exchanging media comprising at least one of pictures, videos, music, and documents; and playing social networking games. Maintaining operative connections to a social networking site related to the user include the autofilter application 110 and/or the application 125 operatively logging into one or more social networking sites to determine instances of communication between the user and contacts of the address book on the social networking sites, and each of the instances of communication and the type of communication on the social networking sites are used to rank in order the contacts of the address book.

The autofilter application 110 and/or the application 125 maintain and store in profiles 115 and/or database 80 communication pattern data between the user and the contacts of the address book. The communication pattern data comprises time of day the user communicates with each of the contacts across communication mediums, how frequently the user communicates with each of the contacts across the communication mediums, and a number of instances of communication that the user communicates with each of the contacts across the communication mediums; all of which is utilized by the autofilter application 110 and/or the application 125 for ranking certain contacts higher in the address book 130.

When the autofilter application 110 and/or the application 125 ranks certain contacts higher in the address book 130 based on the time of day the user communicates with the certain contacts, the certain contacts ranked higher based on the time of day can change ranking when the time of day no longer corresponds to their respective time for communicating with the user. To rank contacts based on communication pattern data, a weighted combination of the time of day the user communicates with the certain contact, how frequently the user communicates with the certain contacts, and the number of instances of communication that the user communicates with the certain contacts are combined by the autofilter application 110 and/or the application 125. The communication mediums on the communication device 10 may include voice calls, emails, text, and/or streaming between the user and the contacts, and this communication pattern data is not extracted from social networking sites.

The autofilter application 110 and/or the application 125 access geographic location data about the contacts of the address book at any point in time, and rank certain contacts in a higher order in the address book based on the geographic location data of the certain contacts indicating that the certain contacts are at least one of within a predefined proximity to the user and nearing a predefined proximity to the user. The autofilter application 110 and/or the application 125 parse messages between the user and the contacts to determine affective terms indicative of meaningful relationships and rank certain contacts higher in the address book based on the messages including the affective terms.

Figure 8:
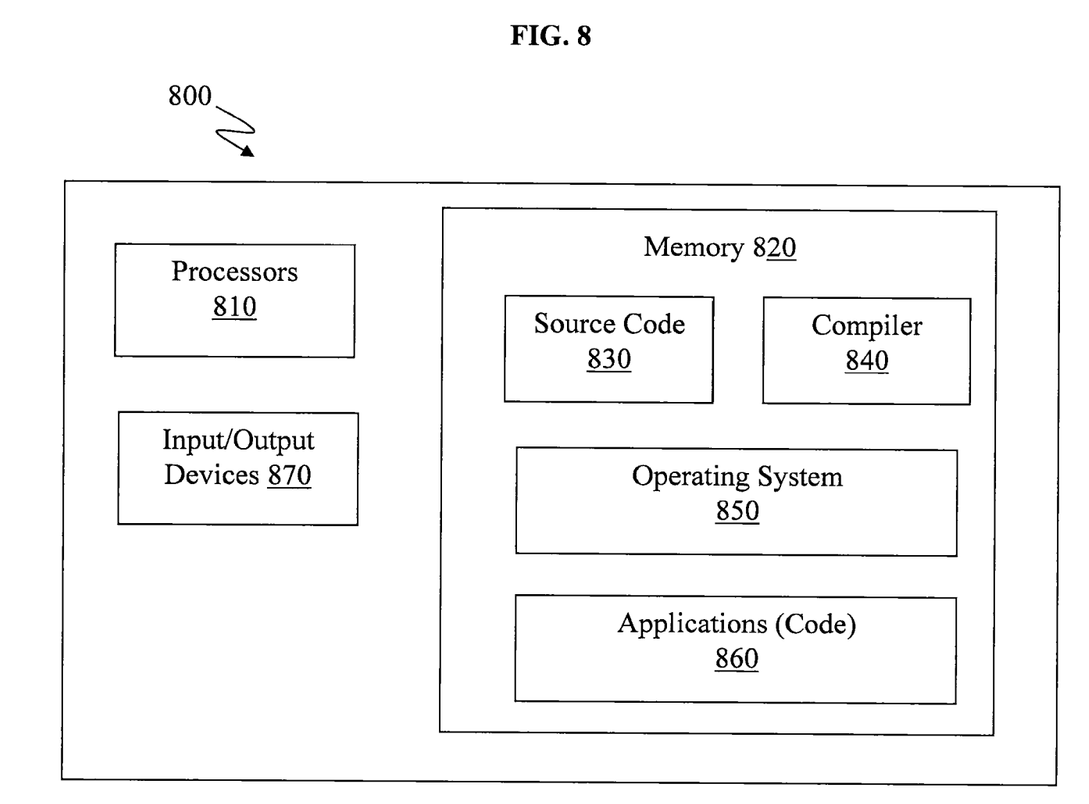
FIG. 8 illustrates an example of a computer having capabilities, which may be included in exemplary embodiments.

FIG. 8 illustrates an example of a computer 800 having capabilities, which may be included in exemplary embodiments. Various methods, procedures, modules, flow diagrams, tools, application, architectures, systems, views, and techniques discussed herein may also incorporate and/or utilize the capabilities of the computer 800. Moreover, capabilities of the computer 800 may be utilized to implement features of exemplary embodiments discussed herein. One or more of the capabilities of the computer 800 may implement any element discussed herein such as in above FIGS. 1-7.

Generally, in terms of hardware architecture, the computer 800 may include one or more processors 810, computer readable storage memory 820, and one or more input and/or output (I/O) devices 870 that are communicatively coupled via a local interface (not shown). The local interface can be, for example but not limited to, one or more buses or other wired or wireless connections, as is known in the art. The local interface may have additional elements, such as controllers, buffers (caches), drivers, repeaters, and receivers, to enable communications. Further, the local interface may include address, control, and/or data connections to enable appropriate communications among the aforementioned components.

The processor 810 is a hardware device for executing software that can be stored in the memory 820. The processor 810 can be virtually any custom made or commercially available processor, a central processing unit (CPU), a data signal processor (DSP), or an auxiliary processor among several processors associated with the computer 800, and the processor 810 may be a semiconductor based microprocessor (in the form of a microchip) or a macroprocessor.

The computer readable memory 820 can include any one or combination of volatile memory elements (e.g., random access memory (RAM), such as dynamic random access memory (DRAM), static random access memory (SRAM), etc.) and nonvolatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 820 may incorporate electronic, magnetic, optical, and/or other types of storage media. Note that the memory 820 can have a distributed architecture, where various components are situated remote from one another, but can be accessed by the processor 810.

The software in the computer readable memory 820 may include one or more separate programs, each of which comprises an ordered listing of executable instructions for implementing logical functions. The software in the memory 820 includes a suitable operating system (O/S) 850, compiler 840, source code 830, and one or more applications 860 of the exemplary embodiments. As illustrated, the application 860 comprises numerous functional components for implementing the features, processes, methods, functions, and operations of the exemplary embodiments. The application 860 of the computer 800 may represent numerous applications, agents, software components, modules, interfaces, controllers, etc., as discussed herein but the application 860 is not meant to be a limitation.

The operating system 850 may control the execution of other computer programs, and provides scheduling, input-output control, file and data management, memory management, and communication control and related services.

The application(s) 860 may employ a service-oriented architecture, which may be a collection of services that communicate with each. Also, the service-oriented architecture allows two or more services to coordinate and/or perform activities (e.g., on behalf of one another). Each interaction between services can be self-contained and loosely coupled, so that each interaction is independent of any other interaction.

Further, the application 860 may be a source program, executable program (object code), script, or any other entity comprising a set of instructions to be performed. When a source program, then the program is usually translated via a compiler (such as the compiler 840), assembler, interpreter, or the like, which may or may not be included within the memory 820, so as to operate properly in connection with the O/S 850. Furthermore, the application 860 can be written as (a) an object oriented programming language, which has classes of data and methods, or (b) a procedure programming language, which has routines, subroutines, and/or functions.

The I/O devices 870 may include input devices (or peripherals) such as, for example but not limited to, a mouse, keyboard, scanner, microphone, camera, etc. Furthermore, the I/O devices 870 may also include output devices (or peripherals), for example but not limited to, a printer, display, etc. Finally, the I/O devices 870 may further include devices that communicate both inputs and outputs, for instance but not limited to, a NIC or modulator/demodulator (for accessing remote devices, other files, devices, systems, or a network), a radio frequency (RF) or other transceiver, a telephonic interface, a bridge, a router, etc. The I/O devices 870 also include components for communicating over various networks, such as the Internet or an intranet. The I/O devices 870 may be connected to and/or communicate with the processor 105 utilizing Bluetooth connections and cables (via, e.g., Universal Serial Bus (USB) ports, serial ports, parallel ports, FireWire, HDMI (High-Definition Multimedia Interface), etc.).

When the computer 800 is in operation, the processor 810 is configured to execute software stored within the memory 820, to communicate data to and from the memory 820, and to generally control operations of the computer 800 pursuant to the software. The application 860 and the O/S 850 are read, in whole or in part, by the processor 810, perhaps buffered within the processor 810, and then executed.

When the application 860 is implemented in software it should be noted that the application 860 can be stored on virtually any computer readable storage medium for use by or in connection with any computer related system or method. In the context of this document, a computer readable storage medium may be an electronic, magnetic, optical, or other physical device or means that can contain or store a computer program for use by or in connection with a computer related system or method.

The application 860 can be embodied in any computer-readable medium 820 for use by or in connection with an instruction execution system, apparatus, server, or device, such as a computer-based system, processor-containing system, or other system that can fetch the instructions from the instruction execution system, apparatus, or device and execute the instructions. In the context of this document, a "computer-readable storage medium" can be any means that can store, read, write, communicate, or transport the program for use by or in connection with the instruction execution system, apparatus, or device. The computer readable medium can be, for example but not limited to, an electronic, magnetic, optical, or semiconductor system, apparatus, or device.

More specific examples (a nonexhaustive list) of the computer-readable medium 620 would include the following: an electrical connection (electronic) having one or more wires, a portable computer diskette (magnetic or optical), a random access memory (RAM) (electronic), a read-only memory (ROM) (electronic), an erasable programmable read-only memory (EPROM, EEPROM, or Flash memory) (electronic), an optical fiber (optical), and a portable compact disc memory (CDROM, CD R/W) (optical). Note that the computer-readable medium could even be paper or another suitable medium, upon which the program is printed or punched, as the program can be electronically captured, via for instance optical scanning of the paper or other medium, then compiled, interpreted or otherwise processed in a suitable manner if necessary, and then stored in a computer memory.

In exemplary embodiments, where the application 660 is implemented in hardware, the application 660 can be implemented with any one or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

It is understood that the computer 600 includes non-limiting examples of software and hardware components that may be included in various devices, servers, routers, switches, and systems discussed herein, and it is understood that additional software and hardware components may be included in the various devices and systems discussed in exemplary embodiments.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated The flow diagrams depicted herein are just one example. There may be many variations to this diagram or the steps (or operations) described therein without departing from the spirit of the invention. For instance, the steps may be performed in a differing order or steps may be added, deleted or modified. All of these variations are considered a part of the claimed invention.

While the exemplary embodiments of the invention have been described, it will be understood that those skilled in the art, both now and in the future, may make various improvements and enhancements which fall within the scope of the claims which follow. These claims should be construed to maintain the proper protection for the invention first described.

What is claimed is:

1. An apparatus for filtering an address book, the apparatus comprising:
    memory comprising computer-executable instructions for providing address book services; and
    a processor executing the computer-executable instructions, the computer-executable instructions, when executed by the processor, cause the processor to perform operations comprising:
    reading contacts of the address book of a user;
    maintaining an operative connection to a social networking site related to the user;
    extracting social networking communication data of the user from the social networking site;
    ranking the contacts in the address book based on the social networking communication data of the user;
    responsive to ranking the contacts in the address book, automatically displaying highest ranked contact icons on a display for the user without requiring the user to select and access the address book, the highest ranked contact icons being displayed while not visually displaying the address book with other contacts on the display;
    ranking a certain contact higher in the address book when the user is exercising such that the certain contact is displayed on the display for a period of exercising, wherein the exercising includes walking, jogging, and running;
    ranking the certain contact higher in the address book based on messages comprising affective terms in order to display the certain contact in the highest ranked contact icons, wherein the affective terms are predefined and stored in the memory;
    wherein the affective terms comprise salutations of strong emotional connection and terms showing close relationship connection; and
    ranking the certain contact in the highest ranked contact icons after the user has both been within the predefined proximity of the certain contact and also communicated to the certain contact according to an additional option, where the additional option includes at least one of the user communicating with the certain contact before coming into the predefined proximity, the user communicating with the certain contact during the predefined proximity, and the user communicating with the certain contact after leaving the predefined proximity.

2. The apparatus of claim 1, wherein extracting the social networking communication data of the user from the social networking site comprises:
    determining a number of instances of communication on the social network site with the contacts of the address book, wherein the instances of the communication are communications between the user and the contacts on the social network site; and
    ranking the contacts higher who have a higher number of the instances of the communication with the user.

3. The apparatus of claim 2, wherein the instances of the communication of the social network site between the user and the contacts comprises: electronic mail; texts; exchanging media comprising pictures, videos, music, and documents; and playing social networking games.

4. The apparatus of claim 1, wherein maintaining the operative connection to the social networking site related to the user comprises operatively logging into social networking sites to determine the instances of the communication between the user and the contacts of the address book on the social networking sites; and
    wherein each of the instances of the communication and a type of the communication on the social networking sites are used to rank in order the contacts of the address book.

5. The apparatus of claim 1, wherein the processor is operative for maintaining communication pattern data between the user and the contacts of the address book;
    wherein the communication pattern data comprises time of day the user communicates with each of the contacts across communication mediums, how frequently the user communicates with each of the contacts across the communication mediums, and a number of instances of communication that the user communicates with each of the contacts across the communication mediums; and
    wherein the processor is operative for ranking certain contacts higher in the address book based on the communication pattern data.

6. The apparatus of claim 5, wherein the processor is operative for ranking the certain contacts higher in the address book based the time of day the user communicates with the certain contacts; and
    wherein the certain contacts ranked higher based on the time of day change ranking when the time of day no longer corresponds to their respective time for communicating with the user.

7. The apparatus of claim 5, wherein ranking the certain contacts higher in the address book based on the communication pattern data comprises determining the certain contacts to rank higher based on a weighted combination of the time of day the user communicates with the certain contact, how frequently the user communicates with the certain contacts, and the number of the instances of the communication that the user communicates with the certain contacts.

8. The apparatus of claim 5, wherein the communication mediums comprise voice calls, electronic mail, text, and streaming between the user and the contacts; and
wherein the communication pattern data is not extracted from social networking sites.

9. The apparatus of claim 1, wherein the processor is operative for accessing geographic location data about the contacts of the address book of the user at any point in time.

10. The apparatus of claim 9, wherein the processor is operative for ranking the certain contact in a higher order in the address book based on the geographic location data of the certain contact indicating that the certain contact is nearing the predefined proximity to the user and within the predefined proximity to the user; and
displaying the certain contact in the highest ranked contact icons responsive to the certain contact nearing the predefined proximity to the user and being within the predefined proximity to the user.

11. The apparatus of claim 1, wherein the processor periodically updates a ranking order in the address book based on a weighted combination of:
the social networking communication data of the user from the social networking site;
communication pattern data between the user and the contacts of the address book; and
geographic location data about the contacts of the address book at any point in time relative to a geographic location of the user.

12. The apparatus of claim 1, wherein the processor is operative for parsing the messages between the user and the contacts to determine the affective terms indicative of meaningful relationships;
wherein the affective terms are indicative of expressing love.

13. The apparatus of claim 1, wherein the processor is operative for determining certain contacts to rank higher than the other contacts in the address book; and
wherein the processor is operative for causing:
the certain contacts to be displayed on the display for the user while the other contacts are not displayed on the display; and
the certain contacts to be displayed at a top of a list of contacts in the address book, when the other contacts are positioned below the certain contacts.

14. A method for filtering an address book, comprising:
reading contacts of the address book of a user;
maintaining an operative connection to a social networking site related to the user;
extracting social networking communication data of the user from the social networking site;
ranking the contacts in the address book based on the social networking communication data of the user;
responsive to ranking the contacts in the address book, automatically displaying a highest ranked contact icons on a display for the user without requiring the user to select and access the address book, the highest ranked contact icons being displayed while not visually displaying the address book with other contacts on the display;
ranking a certain contact higher in the address book when the user is exercising such that the certain contact is displayed on the display for a period of exercising, wherein the exercising includes walking, jogging, and running;
ranking the certain contact higher in the address book based on messages comprising affective terms in order to display the certain contact in the highest ranked contact icons, wherein the affective terms are predefined and stored in the memory;
wherein the affective terms comprise salutations of strong emotional connection and terms showing close relationship connection; and
ranking the certain contact in the highest ranked contact icons after the user has both been within the predefined proximity of the certain contact and also communicated to the certain contact according to an additional option, where the additional option includes at least one of the user communicating with the certain contact before coming into the predefined proximity, the user communicating with the certain contact during the predefined proximity, and the user communicating with the certain contact after leaving the predefined proximity.

15. The method of claim 14, wherein extracting the social networking communication data of the user from the social networking site comprises:
determining a number of instances of communication on the social network site with the contacts of the address book, wherein the instances of the communication are communications between the user and the contacts on the social network site; and
ranking the contacts higher who have a higher number of the instances of the communication with the user.

16. The method of claim 15, wherein the instances of the communication of the social network site between the user and the contacts comprises:
electronic mail; texts; exchanging media comprising pictures, videos, music, and documents; and playing social networking games.

17. The method of claim 14, wherein maintaining the operative connection to the social networking site related to the user comprises operatively logging into social networking sites to determine the instances of the communication between the user and the contacts of the address book on the social networking sites; and
wherein each of the instances of the communication and a type of the communication on the social networking sites are used to rank in order the contacts of the address book.

18. The method of claim 14, further comprising maintaining communication pattern data between the user and the contacts of the address book;
wherein the communication pattern data comprises time of day the user communicates with each of the contacts across communication mediums, how frequently the user communicates with each of the contacts across the communication mediums, and a number of instances of communication that the user communicates with each of the contacts across the communication mediums; and
ranking certain contacts higher in the address book based on the communication pattern data.

19. A computer program product, embodied on a non-transitory computer readable medium, for filtering an address book, the computer program product including instructions that, when executed by a computer, cause the computer to perform operations comprising:
reading contacts of the address book of a user;
maintaining an operative connection to a social networking site related to the user;
extracting social networking communication data of the user from the social networking site;

ranking the contacts in the address book based on the social networking communication data of the user;

responsive to ranking the contacts in the address book, automatically displaying a highest ranked contact icon on a display for the user without requiring the user to select and access the address book, the highest ranked contact icon being displayed while not visually displaying the address book with other contacts on the display;

ranking a certain contact higher in the address book when the user is exercising such that the certain contact is displayed on the display for a period of exercising, wherein the exercising includes walking, jogging, and running;

ranking the certain contact higher in the address book based on messages comprising affective terms in order to display the certain contact in the highest ranked contact icons, wherein the affective terms are predefined and stored in the memory;

wherein the affective terms comprise salutations of strong emotional connection and terms showing close relationship connection; and ranking the certain contact in the highest ranked contact icons after the user has both been within the predefined proximity of the certain contact and also communicated to the certain contact according an additional option, where the additional option includes the user communicating with the certain contact before coming into the predefined proximity, the user communicating with the certain contact during the predefined proximity, and the user communicating with the certain contact after leaving the predefined proximity.

* * * * *